United States Patent
Speggiorin

(10) Patent No.: US 8,028,963 B2
(45) Date of Patent: Oct. 4, 2011

(54) MONOPOD SUPPORT ESPECIALLY FOR VIDEO FILMING

(75) Inventor: Paolo Speggiorin, Mussolente VI (IT)

(73) Assignee: Lino Manfrotto + Co. S.p.A., Bassano del Grappa (VI) (IT)

( * ) Notice: Subject to any disclaimer, the term of this patent is extended or adjusted under 35 U.S.C. 154(b) by 741 days.

(21) Appl. No.: 11/992,432

(22) PCT Filed: Jul. 4, 2006

(86) PCT No.: PCT/EP2006/006500
§ 371 (c)(1),
(2), (4) Date: Mar. 21, 2008

(87) PCT Pub. No.: WO2007/039000
PCT Pub. Date: Apr. 12, 2007

(65) Prior Publication Data
US 2009/0084912 A1   Apr. 2, 2009

(30) Foreign Application Priority Data
Sep. 26, 2005   (IT) .............................. PD2005A0278

(51) Int. Cl.
*F16M 11/02* (2006.01)
(52) U.S. Cl. .................. 248/177.1; 248/187.1; 248/562; 248/636; 396/421
(58) Field of Classification Search .................. 248/173, 248/183.2, 177.1, 187.1, 170, 440, 592, 636, 248/637; 188/276, 296; 396/421, 419
See application file for complete search history.

(56) References Cited

U.S. PATENT DOCUMENTS

| | | | | |
|---|---|---|---|---|
| 3,119,469 A | * | 1/1964 | Farr et al. | 188/276 |
| 3,861,503 A | * | 1/1975 | Nash | 188/276 |
| 4,671,479 A | * | 6/1987 | Johnson et al. | 248/173 |
| 4,899,854 A | | 2/1990 | Cartoni | |
| 5,366,193 A | * | 11/1994 | Lindsay | 248/183.2 |
| 5,944,152 A | * | 8/1999 | Lindsay et al. | 188/296 |
| 6,056,450 A | | 5/2000 | Walling | |
| 6,663,298 B2 | | 12/2003 | Haney | |
| 2009/0084912 A1 | * | 4/2009 | Speggiorin | 248/176.3 |

FOREIGN PATENT DOCUMENTS

| | | |
|---|---|---|
| DE | 9404608 U1 | 8/1994 |
| DE | 4423586 A1 | 1/1996 |
| DE | 4341631 C2 | 8/1997 |
| GB | 2160995 A | 1/1986 |
| GB | 2234829 A | 2/1991 |

* cited by examiner

*Primary Examiner* — Tan Le
(74) *Attorney, Agent, or Firm* — James C. Eaves, Jr.; Greenebaum Doll & McDonald PLLC

(57) ABSTRACT

A monopod support especially for video filming comprises a rod at the longitudinally opposite ends of which are provided a base and an attachment for a video-photographic apparatus, respectively. The rod is rotatable with respect to the base about a substantially longitudinal axis of the rod and at least one shock-absorbing element of the type having a viscous coupling is interposed between the base and the rod in order to damp the vibrations resulting from the rotational movement of the rod with respect to the base about the axis of the rod.

16 Claims, 3 Drawing Sheets

MONOPOD SUPPORT ESPECIALLY FOR VIDEO FILMING

TECHNICAL FIELD

The present invention relates to a monopod support devised especially for video filming, substantially reducing the shaking typical of manual filming.

BACKGROUND ART

When filming is carried out with hand-held video cameras and the like, it is inevitable that it will be subject to shaking in the three axes of three-dimensional space. For this reason, the use of supports which serve to improve filming quality by minimising such shaking is strongly recommended. Of these supports, those having a tripod configuration offer the best guarantees of image stability. Tripod supports, however, have the unavoidable disadvantage of being very bulky and heavy whereas the bulk and weight are much more modest in so-called monopod supports in which the filming apparatus is mounted at the top of a rod which is generally telescopically adjustable and the opposite end of which rests on the ground. The angles of oscillation in the vertical plane containing the axis of the rod and about the optical axis of the objective are minimised because they are related to the fulcrum of the oscillation which is in this case at a distance from the apparatus, at the point where the monopod rests on the ground (base). This allows a drastic reduction in the oscillation about the corresponding axes.

On the other hand, the oscillating movement in the so-called panoramic axis, about the axis of the rod of the monopod, remains substantially unchanged. The annoying shaking discussed above therefore persists in this movement. For this reason, monopod supports have hitherto been used to some extent in the field of still photography but they have not enjoyed as much success in the field of video filming.

DISCLOSURE OF THE INVENTION

The object of the present invention is to provide a monopod support which is devised structurally and functionally to avoid all of the disadvantages discussed with reference to the mentioned prior art.

This object is achieved by the invention by means of a monopod support produced in accordance with the claims which follow.

BRIEF DESCRIPTION OF THE DRAWINGS

The features and advantages of the invention will emerge more clearly from the detailed description of a preferred but non-exclusive embodiment thereof which is illustrated by way of non-limiting example with reference to the appended drawings in which.

BEST MODE FOR CARRYING OUT THE INVENTION

Figure 1:
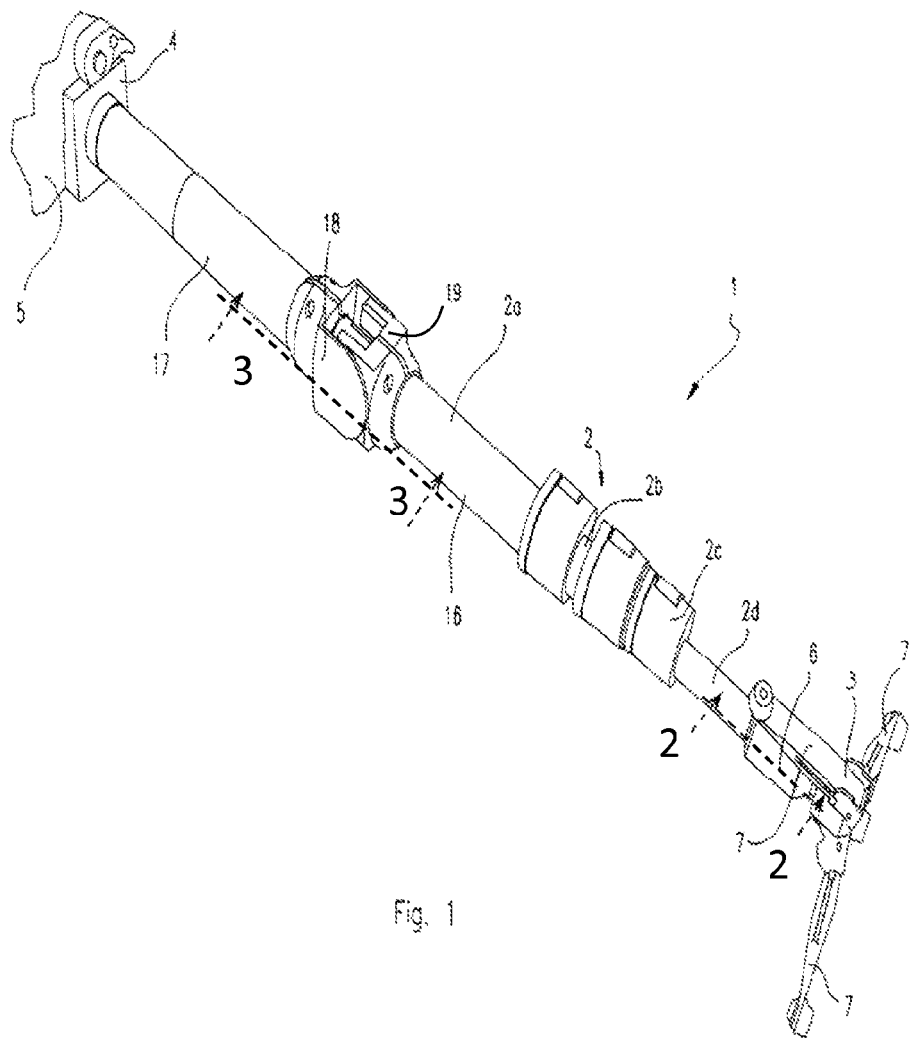
FIG. 1 is a perspective view of a monopod support according to this invention.
Figure 2:
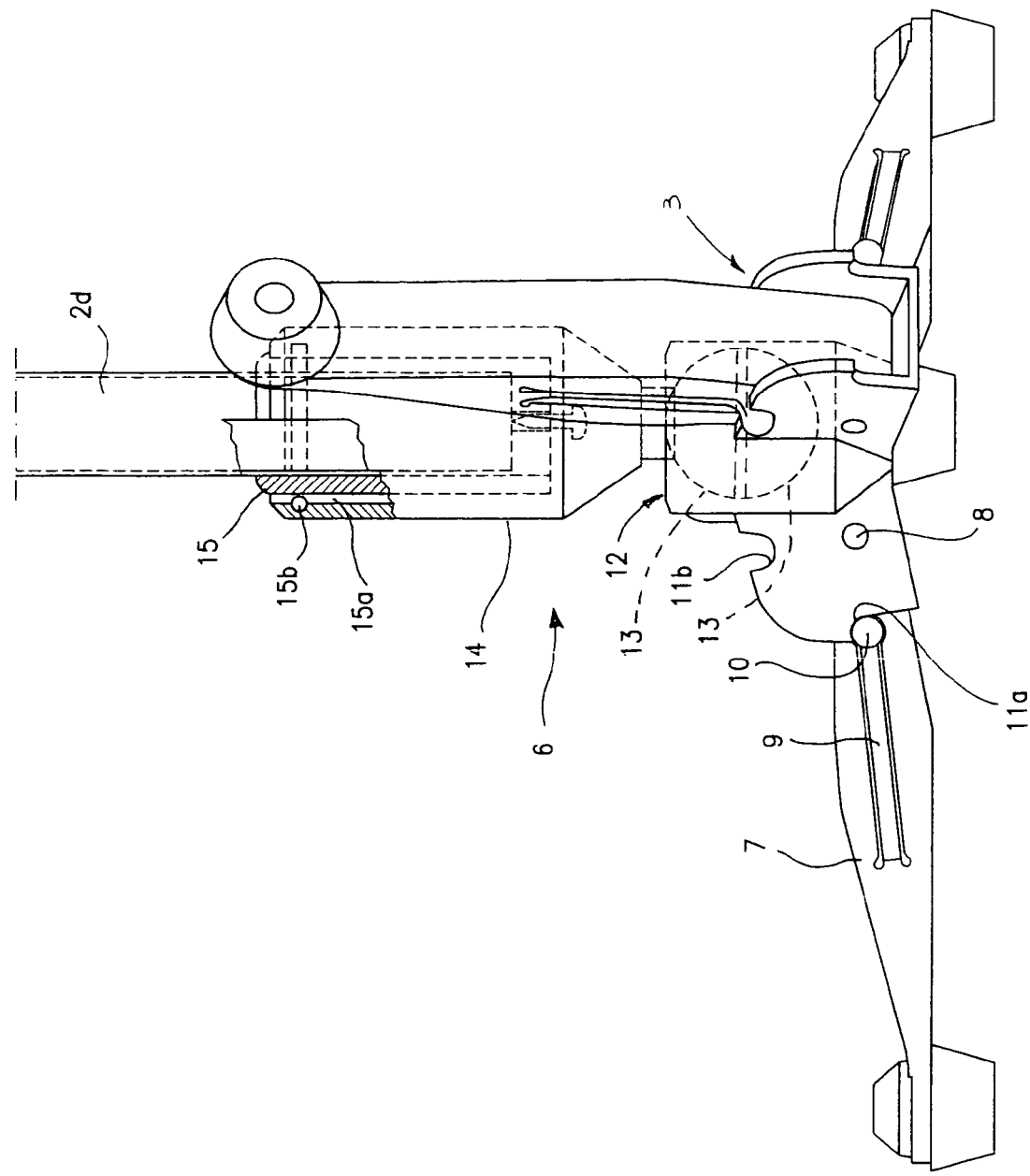
FIG. 2 is a view in longitudinal section of a detail of the support of FIG. 1.
Figure 3:
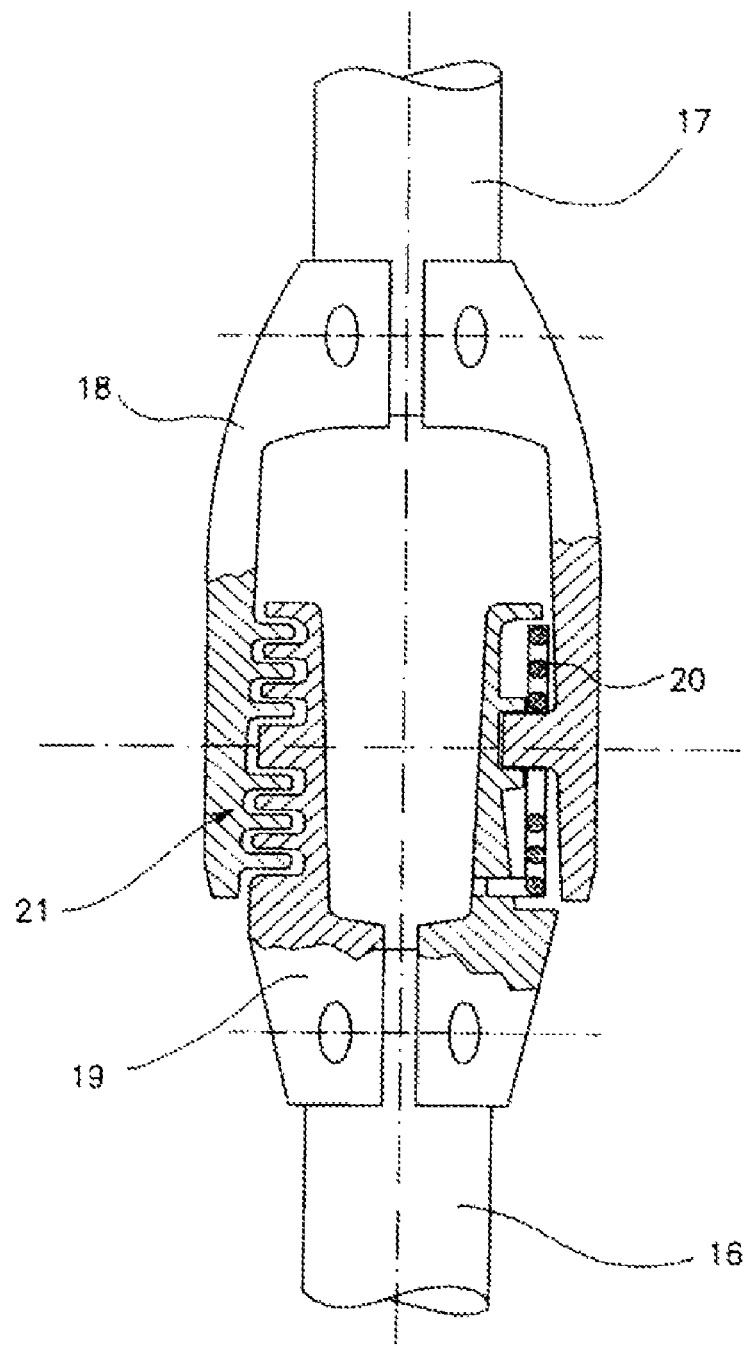
FIG. 3 is a diagrammatic sectioned view on an enlarged scale of a detail of the support of the previous Figures.

In FIG. 1, 1 indicates generally a monopod support especially for video filming, comprising a telescopic rod 2 formed by a plurality of rod elements 2a,b,c,d which are telescopically slidable one inside the other and which are lockable in a manner known per se relative to each other in such a fashion as to vary the extension of the rod 2 as desired. A base 3 and an attachment 4 for a video-photographic apparatus 5 are provided at the respective longitudinally opposite ends of the rod 2. The base 3 acts as a bearing on the ground for the support and comprises a cross-member 6 from which at least one and preferably three appendages 7 extend(s), these being articulated to the cross-member in such a manner that they can be pivoted about a respective pin 8 and temporarily snap-locked in a releasable manner into an operative position, extending substantially in the radial direction relative to the cross-member to form a tripod pedestal, or into a rest position, close to the rod 2, by means of resilient tongues 9 which are cut partially out of the stem of the appendages 7 and which have at their ends a pin 10 which snap-engages in a corresponding recess 11a, b of the cross-member 6. The provision of even a single appendage enables the monopod support to be locked on the ground by pressing on the appendage 7 with the foot in order to obtain a markedly more stable hold of the monopod support than when the latter simply rests on the ground.

The base 3 further comprises an articulation 12 having a ball joint 13, which articulation is interposed between the cross-member 6 and the rod 2 and by means of which the rod 2 can be oriented with respect to the base 3. The joint 13 is connected by means of a shank thereof to a beaker-shaped member 14 in which the lower end of the rod 2 is engaged with the interposition of a sleeve 15. A gap 15a is defined between the beaker-shaped member 14 and the sleeve 15, coaxially with the latter, and is closed in a leak-tight manner by an O-ring seal 15b and filled with a viscous fluid in order to define a shock-absorbing element having a viscous coupling, such as described, for example, in the U.S. Pat. No. 4,899,854 in the name of Cartoni. This shock-absorbing element, owing to the viscous fluid held in the gap 15a, ensures that the rotation of the sleeve 15 with respect to the beaker-shaped member 14 involves the entrainment of the viscous fluid with the consequent damping of the associated vibratory phenomena. Although this type of shock-absorbing element is to be regarded as preferred, it will be appreciated that it may be replaced by friction shock-absorbers or other types of shock-absorber.

It is envisaged that all of the rod elements 2a-d should be rigid, but it is also provided that the first rod element 2a should be articulated in two portions 16, 17 with the interposition of an articulation including a first fork-shaped element 18 which is articulated to a second articulation element 19 in a manner pivotable about an axis transverse to the rod 2. Interposed between the articulation elements 18, 19 are a balancing spring 20, on one side of the fork, which tends to maintain the two articulation elements in a relative position such that the two portions 16, 17 of the rod element 2a are substantially aligned with each other, and a viscous coupling 21, on the other side of the fork, which acts as a damper for any shaking and/or vibration in the relative pivoting of the articulation elements. This viscous coupling, which is known per se, is of the type described in U.S. Pat. No. 4,899,854. In use, the monopod support is extended to the desired length, with the video camera fitted to the attachment 5 and with the base open in such a manner that all three of the appendages 7 extend radially with respect to the cross-member 6.

The positioning and the movements of inclination downwards and upwards and also the lateral oscillations of the rod with respect to the base are permitted by the ability of the ball joint articulation to move. These movements, as indicated above, do not give rise to any appreciable vibratory phenomena owing to the distance between the centre of oscillation and the video camera and are unavoidable when searching for the vertical position when the monopod is resting on inclined ground.

The rotational movements about the so-called panoramic axis, which coincides substantially with the axis of the rod 2, are, however, damped by the shock-absorbing element having a viscous coupling, which element is interposed between the rod and the base and the friction of which is, however, less than the resistance offered by the ball joint articulation. As a result, the movements of the video camera in the three axes indicated do not produce appreciable vibratory effects even though the support is of the monopod type.

Further advantages of the invention include the small bulk, the modest weight, the ease of positioning and the stability thereof, which is further improved by the presence of appendages on the base of the monopod.

The invention claimed is:

1. A monopod support (1) especially for video filming, comprising a rod (2) at the longitudinally opposite ends of which are provided a base (3) and an attachment (4) for a video-photographic apparatus, respectively, wherein the rod (2) is rotatable with respect to the base (3) about a substantially longitudinal axis of the rod, and at least one shock-absorbing element (12) of the type having a viscous coupling is interposed between the base and the rod in order to damp the vibrations resulting from the rotational movement of the rod with respect to the base about the axis of the rod.

2. A monopod support according to claim 1, wherein the shock-absorbing element comprises, between the base and the rod, a gap (15a) in which a viscous fluid is contained.

3. A monopod support according to claim 2, wherein the gap (15a) is defined between a beaker-shaped member (14) which is fixedly joined to the base and a sleeve (15) which is fixedly joined to the rod and accommodated coaxially in the beaker-shaped member with leak-tight closure by sealing means.

4. A monopod support according to claim 1, wherein the base (3) comprises at least one appendage (7) extending laterally with respect to the axis of the rod.

5. A monopod support according to claim 4, wherein the base comprises at least three appendages (7) arranged to form a tripod pedestal.

6. A monopod support according to claim 5, wherein each of the appendages is articulated pivotably to a cross-member (6) of the base.

7. A monopod support according to claim 1, wherein an articulation (12) is provided between the base and the rod.

8. A monopod support according to claim 7, wherein the articulation is of the ball joint type.

9. A monopod support according to claim 1, wherein a further articulation (18,19) is provided between contiguous portions (16,17) of at least one of the rod elements in order to permit the pivoting of those portions with respect to each other about an axis at right-angles to the axis of the rod.

10. A monopod support according to claim 9, wherein the further articulation comprises articulation elements (18,19) between which at least one balancing spring (20) tending to urge the articulation elements resiliently towards a predetermined relative position is active.

11. A monopod support according to claim 9, wherein at least one shock-absorbing element having a viscous coupling (21) is interposed between the articulation elements.

12. A monopod support according to claim 10, wherein at least one shock-absorbing element having a viscous coupling (21) is interposed between the articulation elements.

13. A monopod support according to claim 3, wherein a further articulation (18,19) is provided between contiguous portions (16,17) of at least one of the rod elements in order to permit the pivoting of those portions with respect to each other about an axis at right-angles to the axis of the rod.

14. A monopod support according to claim 13, wherein the further articulation comprises articulation elements (18,19) between which at least one balancing spring (20) tending to urge the articulation elements resiliently towards a predetermined relative position is active.

15. A monopod support according to claim 13, wherein at least one shock-absorbing element having a viscous coupling (21) is interposed between the articulation elements.

16. A monopod support according to claim 14, wherein at least one shock-absorbing element having a viscous coupling (21) is interposed between the articulation elements.

* * * * *

UNITED STATES PATENT AND TRADEMARK OFFICE
CERTIFICATE OF CORRECTION

| | | |
|---|---|---|
| PATENT NO. | : 8,028,963 B2 | Page 1 of 1 |
| APPLICATION NO. | : 11/992432 | |
| DATED | : October 4, 2011 | |
| INVENTOR(S) | : Paolo Speggiorin | |

It is certified that error appears in the above-identified patent and that said Letters Patent is hereby corrected as shown below:

In the Claims

In claim 1, column 3, line 27 (7th line of claim 1), delete "(12)".

Signed and Sealed this
Twenty-ninth Day of April, 2014

Michelle K. Lee
*Deputy Director of the United States Patent and Trademark Office*